United States Patent
Baret et al.

[11] Patent Number: 6,014,892
[45] Date of Patent: Jan. 18, 2000

[54] TRACER GAS LEAK DETECTOR

[75] Inventors: Gilles Baret, Annecy; Roland Gevaud, Argonay; Alain Devance, Ugine, all of France

[73] Assignee: Alcatel, Paris, France

[21] Appl. No.: 09/053,769

[22] Filed: Apr. 2, 1998

[30] Foreign Application Priority Data

Apr. 3, 1997 [FR] France .................................. 97 04077

[51] Int. Cl.⁷ ............................................... G01M 3/20
[52] U.S. Cl. ......................................... 73/40.7; 73/40
[58] Field of Search ........................... 73/40.7, 40, 2

[56] References Cited

U.S. PATENT DOCUMENTS

| | | | |
|---|---|---|---|
| 3,591,827 | 7/1971 | Hall | 315/108 |
| 4,172,477 | 10/1979 | Reich | 141/8 |
| 4,436,998 | 3/1984 | Tallon | 250/288 |
| 4,492,110 | 1/1985 | Bergquist | 73/40.7 |
| 4,499,752 | 2/1985 | Fruzzetti et al. | 73/40.7 |
| 4,510,792 | 4/1985 | Morel et al. | 73/40.7 |
| 4,735,084 | 4/1988 | Fruzzetti | 73/40.7 |
| 4,773,256 | 9/1988 | Saulgeot | 73/40.7 |
| 4,776,207 | 10/1988 | Holm | 73/40.7 |
| 4,779,449 | 10/1988 | Bley et al. | 73/40.7 |
| 4,919,599 | 4/1990 | Reich et al. | 417/423.4 |
| 5,131,263 | 7/1992 | Handke et al. | 73/40.7 |
| 5,297,422 | 3/1994 | Baret | 73/40.7 |
| 5,317,900 | 6/1994 | Bergquist | 73/40.7 |
| 5,341,671 | 8/1994 | Baret et al. | 73/40.7 |
| 5,537,857 | 7/1996 | Grosse Bley, et al. | 73/40.7 |
| 5,561,240 | 10/1996 | Ochiai et al. | 73/40.7 |
| 5,585,548 | 12/1996 | Grosse Bley et al. | 73/40.7 |
| 5,625,141 | 4/1997 | Mahoney et al. | 73/40.7 |
| 5,661,229 | 8/1997 | Bohm et al. | 73/40.7 |
| 5,756,881 | 5/1998 | Stockli et al. | 73/40.7 |
| 5,821,404 | 10/1998 | Bohm et al. | 73/40.7 |
| 5,880,357 | 3/1999 | Bohm | 73/40.7 |

FOREIGN PATENT DOCUMENTS

| | | |
|---|---|---|
| 0432305A1 | 6/1991 | European Pat. Off. . |
| 2604522 | 4/1988 | France . |
| 19523430A1 | 1/1996 | Germany . |
| 19504278A1 | 8/1996 | Germany . |

OTHER PUBLICATIONS

G. Reich, The Principle of HE Enrichment in a Counterflow Leak Detector with a Turbomolecutor Pump with Two Inlets, *Journal of Vacuum Science and Technology, Part A.,* vol. 5, No. 4, Jul. 1987–Aug. 1987, New York, US pp. 2641–2645.

*Primary Examiner*—Hezron Williams
*Assistant Examiner*—J. David Wiggins
*Attorney, Agent, or Firm*—Sughrue, Mion, Zinn Macpeak & Seas, PLLC

[57] ABSTRACT

A tracer gas leak detector that analyzes a test gas for presence of a tracer gas therein, including at least one gas analyzer, a secondary pump whose suction inlet is connected to the gas analyzer, a primary pump connected to the secondary pump outlet via a first pipe fitted with a first valve, and a second pipe connecting the first pipe from a point situated between the first valve and the primary pump to an inlet of the detector for connection to an enclosure via a pre-evacuated flow and said gas analyzer receiving said test gas from a part of said pre-evacuated flow, the second pipe being fitted with a second valve, the primary pump serving to pre-evacuate the enclosure, wherein a sampling member for sampling the flow travelling along the second pipe is situated directly on the wall of the second pipe in direct contact with the flow and is connected via a duct directly to the analyzer, the sampling member having flow conductance enabling the pressure in the duct to be compatible with operation of the gas analyzer while the second pipe is at a pressure greater than 10 mbar.

14 Claims, 3 Drawing Sheets

TRACER GAS LEAK DETECTOR

The present invention relates to a tracer gas leak detector.

More particularly, the invention provides a leak detector in which a single primary pump is used both in association with a secondary pump to provide the vacuum required to enable the gas analyzer to operate, and also to perform pre-evacuation of the test enclosure which is connected to the inlet of the detector.

BACKGROUND OF THE INVENTION

A commonly used detector of this type is shown in FIG. 1. It comprises a spectrometer 1, a secondary pump 2, and a primary pump 3 whose suction inlet is connected to the delivery from the secondary pump 2 outlet via a pipe 4 fitted with a valve 5. The inlet 6 of the detector is connected by a pipe 7 fitted with a valve 8 to the suction inlet of the primary pump 3. A pipe 9 fitted with a valve 10 for so-called "direct" measurement connects the pipe 7 to the spectrometer 1.

Such a detector is very well suited to detecting small leaks in seals in test parts, however very large leaks cannot always be detected or it can take a very long time to detect them.

After the spectrometer 1 has been evacuated, the part under test, connected to the inlet 6, is pre-evacuated by the primary pump 3, the valves 5 and 10 are closed and the valve 8 is open, the pump 2 is kept running, and the spectrometer 1 is in operation. The valve 5 can be opened for performing measurements in counterflow only after the inlet pressure to the detector has dropped at least down to 10 mbar, and often down to 1 mbar. This pressure must be compatible with the maximum outlet pressure of the secondary pump and must enable the gas analyzer to operate properly. If the leak is large, the time required to reach this pressure level can be very long; and indeed it might never be reached if the leak is very large. Under such circumstances, it can nevertheless be deduced that there is a large leak because the pressure does not go down. A more serious situation relates to detecting leaks on sealed parts. Under such circumstances, the parts to be inspected are sealed under a tracer gas, or else they are sealed under air or a dry gas other than the tracer gas and are then pressurized in an enclosure containing the tracer gas at a pressure of the order of a few bars. If such a part has a leak, then helium penetrates into the part through the leak. After being immersed for several hours, the part is removed from the pressurized helium enclosure and is placed in an enclosure which is connected to the inlet 6 of the detector. If a part containing a tracer gas (helium) has only a small leak, then pre-evacuation of the enclosure by the primary pump 3 makes it possible to achieve a pressure at the inlet to the detector which is compatible with operation of the mass spectrometer 1 and thus to open the valve 5 long before the part has lost all its helium. It is therefore very easy to measure the leak; however, if on the contrary the leak is very large, then all the helium contained in the part can be evacuated therefrom and from the enclosure solely during the pre-evacuation stage, and thus by the time the pressure has reached a value that enables the valve 5 to be opened, all or most of the helium may already have been removed, in which case measurement will indicate no leak or only a small leak.

SUMMARY OF THE INVENTION

An object of the present invention is to solve that problem with that type of detector, i.e. a detector in which a single primary pump both provides the pumping necessary to operate the spectrometer pumping in association with a secondary pump, and for pre-evacuating the part to be inspected or an enclosure in which the part to be inspected has been placed.

The invention thus provides a tracer gas leak detector comprising at least one gas analyzer, a secondary pump whose suction inlet is connected to the gas analyzer, a primary pump connected to the delivery of the secondary pump via a first pipe fitted with a first valve, and a second pipe connecting the first pipe from a point situated between said first valve and said primary pump to an inlet of the detector for connection to an enclosure, said second pipe being fitted with a second valve, said primary pump serving to pre-evacuate said enclosure, wherein a sampling member for sampling the flow travelling along said second pipe is situated directly on the wall of said second pipe in direct contact with said flow and is connected via a duct directly to said analyzer, said sampling member having a conductance enabling the pressure in said duct to be compatible with the operation of said gas analyzer while said second pipe is at a pressure greater than 10 mbar.

Advantageously, said sampling member is situated between said second valve and said primary pump, to retard the rise of pressure at the delivery of the secondary pump when the first valve is closed, when the spectrometer is in working order, and when said second pipe at said sampling member is at a pressure greater than 10 mbar.

The invention also provides a method of detecting large leaks using a detector as defined above, wherein, after the necessary vacuum has been established in the gas analyzer, and the inlet of the detector is connected to an enclosure containing a part to be inspected or else directly to the part to be inspected, said first valve is closed and said second valve is opened, with measurement taking place immediately.

Thus, large leaks can be measured even when the part has not been pre-evacuated and response time is very short since the sampling member is in direct contact with the helium-carrying flow.

BRIEF DESCRIPTION OF THE DRAWINGS

An embodiment of the invention is described below with reference to the accompanying drawings, in which.

DETAILED DESCRIPTION OF THE PREFERRED EMBODIMENTS

Figure 1:
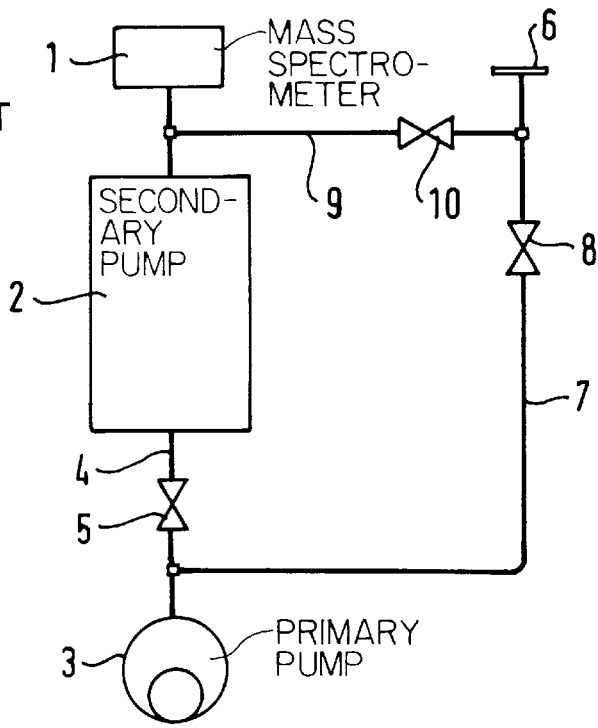
FIG. 1 is described above and is a diagram of a prior art leak detector.
Figure 2:
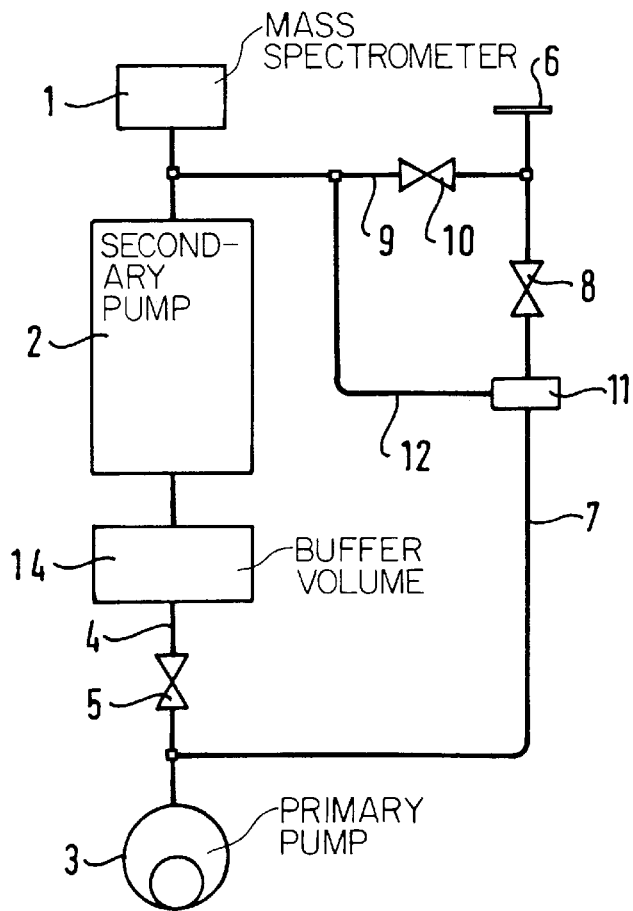
FIG. 2 is a schematic diagram of a leak detector in accordance with the present invention.

With reference to FIG. 2, the leak detector of the present invention comprises a gas analyzer 1 such as a mass spectrometer set to the tracer gas in use, such as helium, for example. It is connected to the inlet of a secondary pump 2 whose delivery is connected to a primary pump 3 via a first pipe 4 fitted with a first valve 5. The detector also includes an inlet 6, e.g. an inlet coupling for connecting either directly to a part to be inspected by the spray method, or else to an enclosure containing the part to be inspected and enclosing the tracer gas (helium). The inlet 6 is connected via a second pipe 7 fitted with a second valve 8 to the suction inlet of the primary pump 3, between the primary pump and the first valve 5. Optionally, the detector may also include a third pipe 9 fitted with a third valve 10 connecting the inlet 6 of the detector to the spectrometer 1 and enabling the "direct" method to be used for measuring small leaks.

Figure 5:
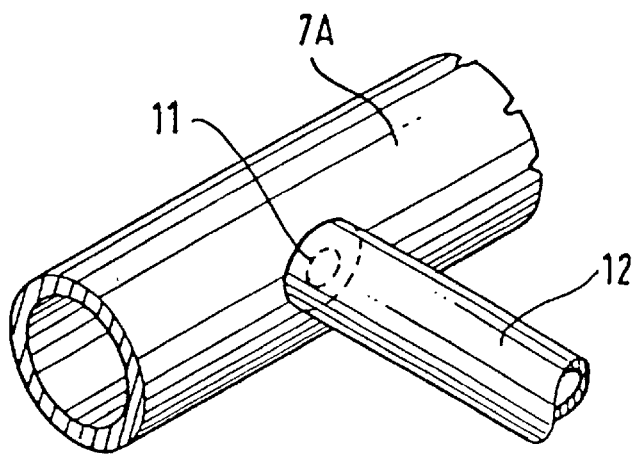
FIG. 5 is a detail of FIGS. 2, 3, or 4 showing the sampling member inserted in the link pipe connecting the primary pump to the detector inlet.

According to the invention, a sampling member 11 (see detail of FIG. 5) for sampling the flow in the second pipe 7 is situated on the wall of said second pipe, e.g. on the wall of a portion of pipe 7A inserted in series in the pipe 7, and it is also directly connected via a duct 12 to the analyzer 1.

This sampling member has low conductance so as to enable measurements to be performed, i.e. the mass spectrometer 1 to be put into operation, even when the pressure in the second pipe 7 at the sampling member is greater than 10 mbar, and is equal to atmospheric pressure, for example. That is to say, it must make it possible under such conditions to have a pressure of about $10^{-4}$ mbar in the duct 12, with the secondary pump 2 in operation but the first valve 5 closed.

This sampling member 11 may be constituted, for example, merely by a calibrated orifice through the wall of the pipe 7 or 7A. The sampling member 11 may also be a porous membrane, or a film pressed against an orifice through the wall of the pipe 7 or 7A and allowing the tracer gas to diffuse through.

Operation is then as follows:

It is assumed that the detector inlet 6 is connected to a part to be inspected or to an enclosure containing the part to be inspected which in turn contains the tracer gas.

The valves 8 and 10 are closed and the spectrometer 1 is evacuated by opening the first valve 5, while the secondary and primary pumps 2 and 3 are in operation. As soon as the pressure at the secondary pump 2 suction inlet reaches a value which is compatible with the operation of the spectrometer 1 operating, the spectrometer is put into operation and it is possible immediately to measure very large leaks by closing the first valve 5 and opening the second valve 8. The presence of helium in the pumped gas flow is then measured by the spectrometer 1 through the sampling member 11. If the leak is not too large, the pressure decreases in the second pipe 7, and when it reaches a pressure compatible with opening the first valve 5 to enable a countercurrent measurement to be performed, said valve 5 is opened in conventional manner, and then if the pressure becomes even lower, in the event of a leak that is small or non-existent, the second valve 8 is closed and the third valve 10 is opened for direct measurement. The maximum pressure acceptable at the delivery of the secondary pump 2 determines the threshold at which the valve 5 is opened, and said pressure generally lies in the range 1 mbar to 10 mbar.

When operating with a very large leak, with the valves 5 and 10 closed and the valve 8 open, the flow sampled in the duct 7 by the sampling member 11 and passing along the duct 12 is dead-end evacuated by the secondary pump 2 since the first valve 5 is closed. It is therefore advantageous to use a secondary pump 2 having a high compression ratio and capable of operating at a high delivery pressure, e.g. 10 mbar, which can be achieved by using a hybrid molecular-drag pump, for example.

In the detector circuit shown in FIG. 2, a buffer volume 14 is located between the secondary pump 2 and the first valve 5. This has the advantage of retarding the rise of the pressure at the delivery of the secondary pump 2, and thus preventing the pressure at the spectrometer 1 from rising, to a value that is incompatible with spectrometer operation.

Figure 3:
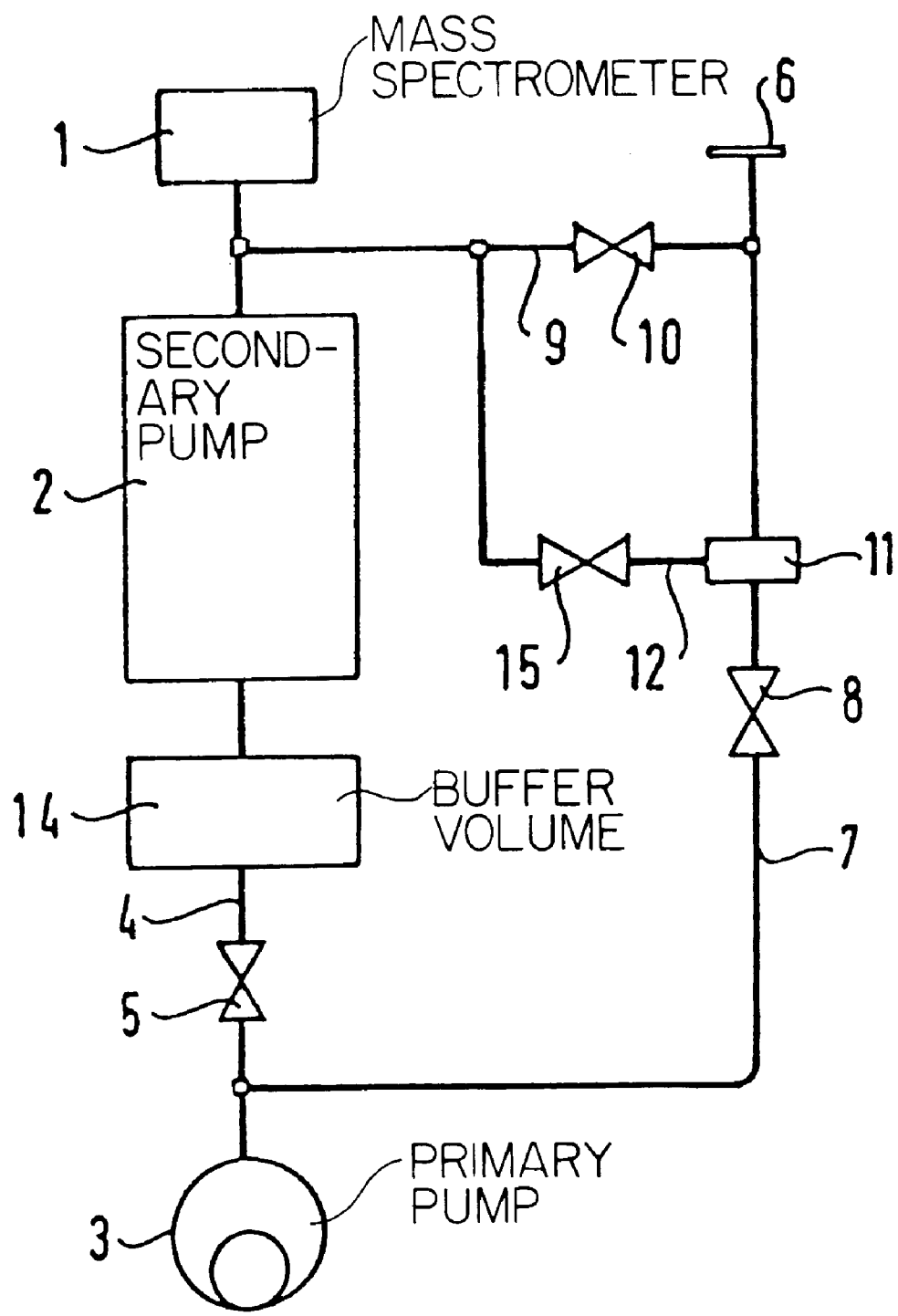
FIG. 3 is a schematic diagram of a second embodiment of the present invention.

It should be observed that the sampling member 11 is placed in FIG. 2 between the second valve 8 and the primary pump 3. That is not absolutely essential. As shown in the embodiment of FIG. 3, it can also be placed between the inlet 6 of the detector and the second valve 8, providing safety means are provided for the spectrometer 1. This can be provided, for example, by a safety valve 15 situated on the duct 12 between the sampling member 11 and the spectrometer 1. This safety valve is normally always open and it is closed automatically whenever the pressure at the secondary pump suction inlet rises to a value which is incompatible with operation of the spectrometer. It is also possible to provide means for automatically switching off the power to the spectrometer if the pressure at the secondary pump suction inlet rises to said value which is incompatible with operation of the spectrometer 1.

The method of operation is the same as for the embodiment of FIG. 2: as soon as the spectrometer 1 has been evacuated, which is made possible by the flow conductance of the sampling member being low, the valve 5 is closed and the second valve 8 is opened so as to pre-evacuate the enclosure (not shown) connected to the inlet coupling 6, with measurement taking place immediately if helium is present in the flow pumped past the sampling member 11.

If the sampling member 11 is judiciously placed very close to the inlet coupling of orifice 6, and if the pressure of the tracer gas in the part under test is greater than the atmospheric pressure in the enclosure connected to the inlet coupling orifice 6 and containing the part under test, it is possible to detect the presence of a leak even before the valve 8 is opened, because of the flow extracted by the sampling member 11.

Figure 4:
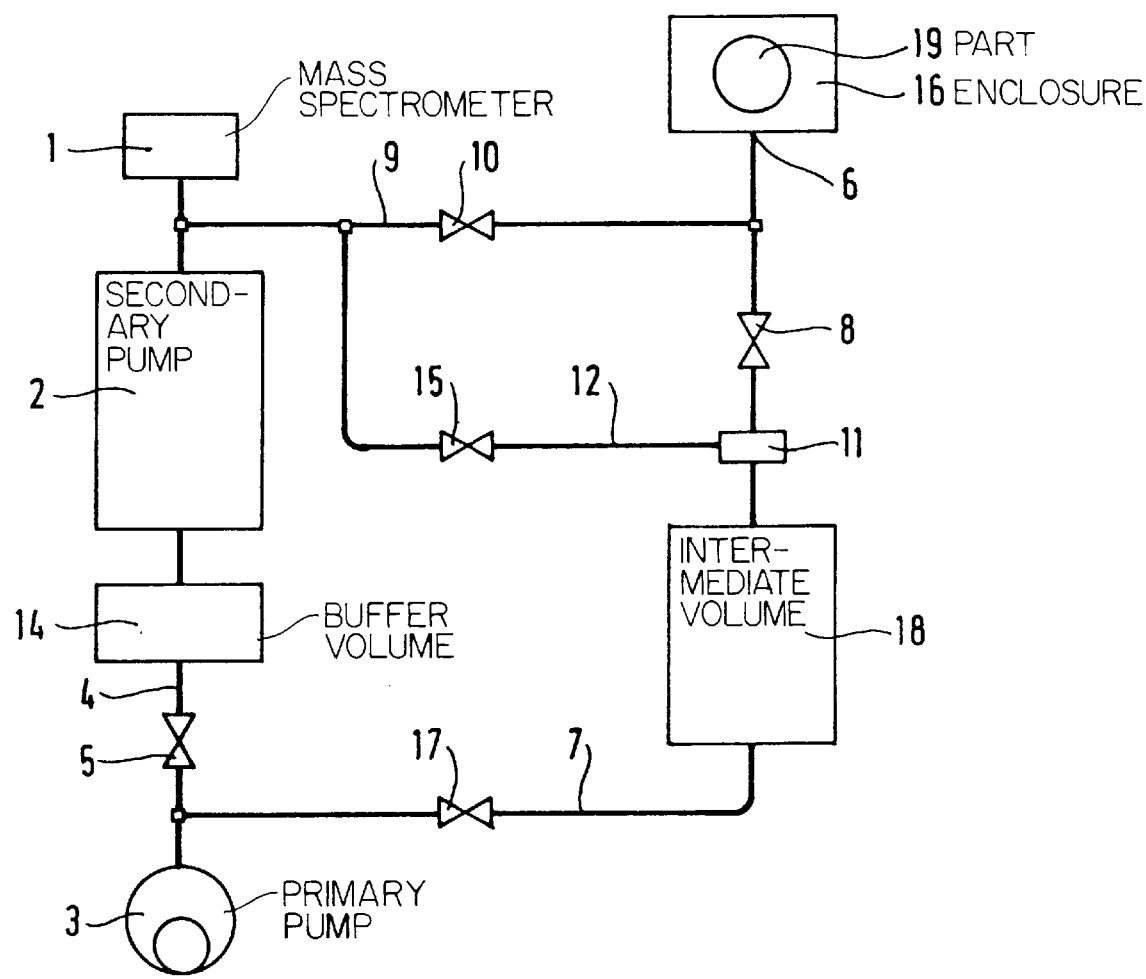
FIG. 4 is a schematic diagram of another embodiment of the present invention.

FIG. 4 shows another embodiment of the present invention. In this embodiment, the inlet coupling 6 is connected to an enclosure 16 containing the part 19 under test which in turn contains the tracer gas. An intermediate volume 18 is situated between the sampling member 11 and the primary pump 3, an isolating valve 17 being situated between said intermediate volume 18 and the pump 3.

This embodiment operates as follows:

When the second valve 8 is closed, the primary pump 3 pumps out the intermediate volume 18 with the isolating valve 17 open and the first valve 5 closed, so as to bring the pressure in this intermediate volume 18 to a value that is lower than atmospheric pressure.

Thereafter the isolating valve 17 is closed and the second valve 8 is opened so as to expand the volume of the enclosure 16 into the intermediate volume 18. The helium in the part under test, if it leaks out, escapes because of the pressure difference and can be measured by the sampling member 11, which could equally well be located on the intermediate volume 18 or on the inlet coupling 6.

What is claimed is:

1. A tracer gas leak detector that analyzes a test gas for presence of a tracer gas therein, comprising a gas analyzer, a secondary pump whose suction inlet is connected to the gas analyzer, a primary pump connected directly to the outlet of the secondary pump via a first pipe fitted with a first valve, and a second pipe connecting the first pipe from a point situated between said first valve and said primary pump to a detector inlet for connection to an enclosure, said second pipe being fitted with a second valve, said primary pump serving to pre-evacuate said enclosure via a pre-evacuated flow and said gas analyzer receiving said test gas from a part of said pre-evacuated flow, wherein a sampling member for sampling a flow travelling along said second pipe is situated directly on a wall of said second pipe in direct contact with said flow and is connected via a bypass duct directly to said analyzer, said sampling member having flow conductance enabling a pressure in said duct to be compatible with operation of said gas analyzer while said second pipe is at a pressure greater than 10 mbar.

2. A detector according to claim 1, wherein said sampling member is situated between said second valve and said primary pump.

3. A detector according to claim 1, wherein said sampling member is situated between said second valve and said inlet of the detector, and safety means is provided to ensure safety of the analyzer.

4. A detector according to claim 3, wherein said safety means comprise a safety valve disposed on said duct between the analyzer and said sampling member, said safety valve being closed automatically if a pressure at the suction inlet of the secondary pump is incompatible with operation of the gas analyzer.

5. A detector according to claim 3, wherein said safety means comprises means for switching off power to said gas analyzer if a pressure at the suction of said secondary pump is incompatible with operation of the gas analyzer.

6. A detector according to claim 1, wherein a buffer volume is disposed between the secondary pump outlet and said first valve.

7. A detector according to claim 1, wherein said sampling member is a calibrated orifice formed through a wall of the second pipe.

8. A detector according to claim 1, wherein said sampling member is a membrane that is porous to the tracer gas and that is applied against an orifice through a wall of the second pipe.

9. A detector according to claim 1, wherein, after a necessary vacuum has been established in the gas analyzer, and the inlet of the detector has been connected either to one of an enclosure containing a part to be inspected and directly to the part to be inspected, said first valve is closed and said second valve is opened, with measurement taking place immediately.

10. A detector according to claim 9, wherein, as soon as a pressure at the inlet of the detector has reached a value lying in a range 1 mbar to 10 mbar, which particular value within said range depends on a compression ratio of said secondary pump, said first valve is opened.

11. A detector according to claim 1, wherein an intermediate volume is placed in the second pipe between said sampling member and an isolating valve disposed in said second pipe.

12. A detection method using the detector according to claim 11, comprising the step of:
expanding a volume of the enclosure connected to the inlet of the detector and containing a part to be tested itself containing a tracer gas, into said intermediate volume.

13. A tracer gas leak detector comprising:

a gas analyzer, a secondary pump whose suction inlet is connected to the gas analyzer, a primary pump connected to the outlet of the secondary pump via a first pipe fitted with a first valve, and a second pipe connecting the first pipe from a point situated between said first valve and said primary pump to a detector inlet for connection ato an enclosure, said second pipe being fitted with a second valve, said primary pump serving to pre-evacuate said enclosure, wherein a sampling member for sampling a flow travelling along said second pipe is situated directly on a wall of said second pipe in direct contact with said flow and is connected via a bypass duct directly to said analyzer, said sampling member having flow conductance enabling a pressure in said duct to be compatible with operation of said gas analyzer while said second pipe is at a pressure greater than 10 mbar;

wherein said sampling member is situated between said second valve and said inlet of the detector, and safety means is provided to ensure safety to the analyzer; and wherein said safety means comprises means for switching off power to said gas analyzer if the pressure at the suction of said secondary pump is incompatible with operation of the gas analyzer.

14. A tracergas leak detector comprising:

a gas analyzer, a secondary pump whose suction inlet is connected to the gas analyzer, a primary pump connected to the outlet of the secondary pump via a first pipe fitted with a first valve, and a second pipe connecting the first pipe from a point situated between said first valve and said primary pump to a detector inlet for connecting to an enclosure, said second pipe being fitted with a second valve, said primary pump serving to pre-evacuate said enclosure, wherein a sampling member for sampling a flow travelling along said second pipe is situated directly on a wall of said second pipe in direct contact with said flow and is connected via a bypass duct directly to said analyzer, said sampling member having flow conductance enabling a pressure in said duct to be compatible with operation of said gas analyzer while said second pipe is at a pressure greater than 10 mbar;

wherein an intermediate volume is placed in the second pipe between said sampling member and an isolating valve disposed in said second pipe; and wherein the enclosure connected to the inlet of the detector and containing a part to be tested itself containing a tracer gas is allowed to expand into said intermediate volume.

* * * * *